Mar. 20, 1923.
W. H. BOVARD
ADJUSTABLE JOINT
Filed June 3, 1922
1,449,140
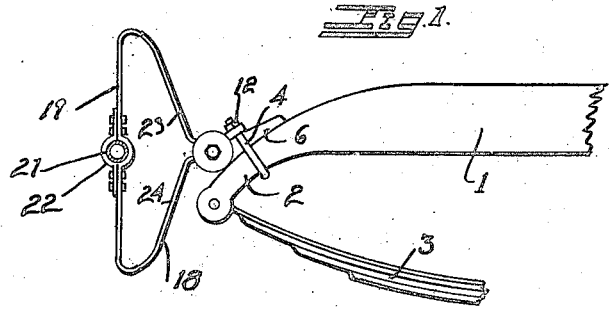
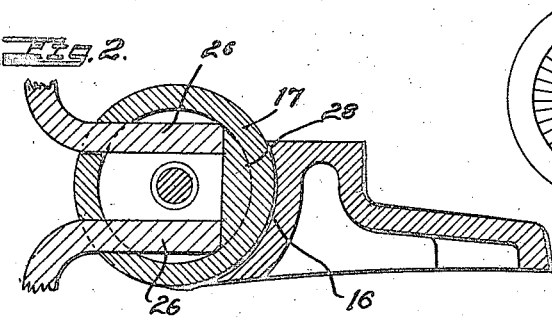
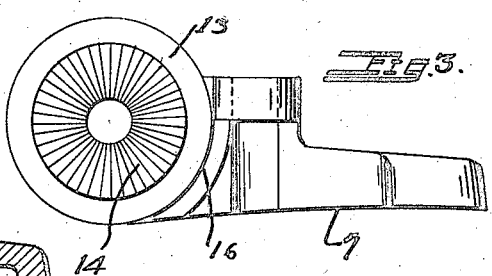
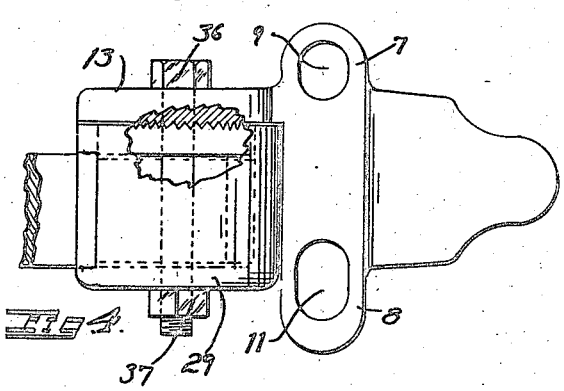
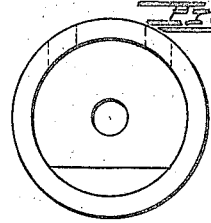
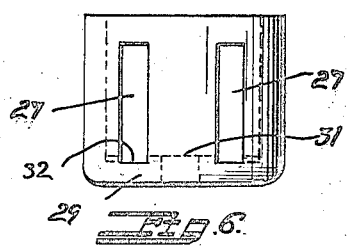
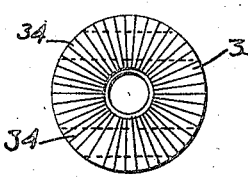
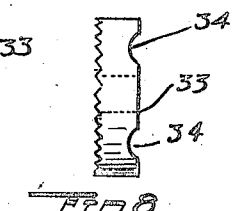
INVENTOR
William H. Bovard
By
ATTORNEYS Patented Mar. 20, 1923.

1,449,140

UNITED STATES PATENT OFFICE.

WILLIAM HENRY BOVARD, OF LOS ANGELES, CALIFORNIA, ASSIGNOR OF ONE-THIRD TO GEORGE O. MOORE, OF LOS ANGELES, CALIFORNIA.

ADJUSTABLE JOINT.

Application filed June 3, 1922. Serial No. 565,584.

*To all whom it may concern:*

Be it known that I, WILLIAM HENRY BOVARD, a citizen of the United States, and a resident of Los Angeles, county of Los Angeles, and State of California, have invented a new and useful Adjustable Joint, of which the following is a specification.

The present invention relates to improvements in adjustable joints and has particular reference to a joint to be used for securing the bumper of a motor vehicle to the frame of the same. The latter frame usually curves downward where it engages the vehicle spring and these curves vary with the different makes of motor vehicles. The frames also vary in cross section and it is the object of the present invention to provide a suitable joint between the bracket holding the bumper and the frame member that may be used for practically any motor vehicle and may be easily adjusted so as to maintain the bumper in its proper position.

With these objects in view I have illustrated the preferred form of my invention in the accompanying drawing, in which Figure 1 shows the end of a frame member of a motor vehicle with my device attached thereto; Figure 2 a longitudinal section through my device; Figure 3 a detail view in side elevation of a casting forming part of my device; Figure 4 a top plan view of the assembled joint; Figure 5 a detail view in end elevation of a holding element for the bracket previously referred to; Figure 6 a plan view of the same, Figure 7 a detail view of a toothed disc, and Figure 8 a side elevation of the same. While I have shown only the preferred form of my invention it should be understood that various changes or modifications may be made within the scope of the claims hereto attached without departing from the spirit of the invention.

The frame member (1) of a motor vehicle terminates in a curved end (2) engaging the main spring (3). To this curved end is secured by means of a suitable clamp (4) the casting (6), the end surface (7) of which is slightly curved so as to rest snugly on the curved surface of the frame. The casting is provided with two lateral projections (7) and (8), each of which is perforated as shown at (9) and (11), and the clamp (4) passes through these two perforations to be secured by any suitable means, as by the nuts (12). The perforation (11) is elongated as shown in Figure 4 which adapts the casting to be used for frames of different widths. From the casting extends rearwardly an arm (13) preferably cylindrical in shape, as shown in Figure 3. This arm is disposed in spaced relation and parallel to the vertical central plane of the casting, and has a toothed or corrugated internal surface (14), the teeth or corrugations being arranged radially. The body portion of the casting presents a curved rear surface (16) adapted to receive a cylindrical holding element (17) for the bracket (18).

The latter bracket is shown in Figure 1 as being substantially triangular in shape, its base (19) having the bumper rod (21) secured thereto by means of a clamp (22), and its two sides (23) and (24) instead of joining at the apex of the triangle terminating in parallel lips (26) adapted to be inserted into the cylindrical element (17) through longitudinal slots (27) in its curved surface. The cylindrical element (17) is hollow but the side opposing the two slots (27) is made solid by the segment (28) which provided a stop for the lips (26). One end (29) of the cylinder is closed or solid and this solid portion extends inwardly slightly beyond the ends of the slots (27) as indicated by the dotted line (31) in Figure 6, leaving, however, grooves (32) in line with the slots, which grooves serve as lateral guide members for the lips. The other end of the cylinder is open and adapted to receive the toothed or corrugated disc (33) illustrated in Figures 7 and 8. The latter is provided on its inside with two grooves (34) running, when the disc is in place, parallel to the grooves (32) in the other end of the cylinder and serving also as lateral guide members for the lips (26). The external face of the disc (33) is toothed or corrugated in the same manner as the internal face (14) of the arm (13), and when the device is assembled the two corrugated faces engage each other while the cylinder is seated on the curved rear surface (16) of the casting and secured to the arm by means of the bolt (36) passing through the arm (13) and the solid end of the cylinder to be secured by means of the nut (37).

To assemble the device the casting (6) is placed on the curved surface of the frame member and firmly secured thereto by means of the clamp (4) and the nuts (12). The lips of the bracket may then be inserted into the cylinder member in the manner described and the disc (33) engaged with the cylinder so that its grooves (34) receive the lips (26). The cylinder is then placed against the arm (13) so that the two corrugated surfaces engage each other and secured by means of the bolt (36). It will be seen that due to this construction the base of the triangular bracket may always be maintained in a vertical position irrespective of the shape of the frame member, and the position of the bracket may be adjusted at any time by merely loosening the nut (37) of the bolt (36). The casting is adapted to fit on any frame member within reasonable limits due to the elongated perforation (11), and the cylinder can hold any size of brackets since if for instance brackets narrower than the length of the slots were selected the only change necessary would be the replacing of the disc (33) by a heavier one, which would bring the slots (34) in firm engagement with the narrower lips.

I claim:

1. An adjustable joint for securing a bracket terminating in two parallel lips to a curved frame member, comprising a casting adapted to snugly engage the frame member and to be secured to the same, having an arm extending therefrom in spaced relation to its center line and presenting an arc-shaped exterior surface, a cylindrical holding element having two longitudinal slots therein for receiving the lips, and guide passages for retaining the same adapted to lie against the arm and the arc-shaped surface and a central bolt for securing the holding element to the arm.

2. An adjustable joint for securing a bracket terminating in two parallel lips to a curved frame member, comprising a casting adapted to snugly engage the frame member and to be secured to the same, having an arm extending therefrom in spaced relation to its center line and presenting an arc-shaped exterior surface, a cylindrical holding element having two longitudinal slots therein for receiving the lips, and guide passages for retaining the same adapted to lie against the arm and the arc-shaped surface and a central bolt for securing the holding element to the arm, the arm-engaging end of the cylinder being removable for interchanging purposes.

WILLIAM HENRY BOVARD.